US012075869B2

(12) United States Patent
Loucks et al.

(10) Patent No.: US 12,075,869 B2
(45) Date of Patent: Sep. 3, 2024

(54) LOCK DEVICE

(71) Applicant: Capital One Services, LLC, McLean, VA (US)

(72) Inventors: Eric Loucks, Highlands Ranch, CO (US); Austen Novis, Jamestown, RI (US); Mykhaylo Bulgakov, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 43 days.

(21) Appl. No.: 17/650,713

(22) Filed: Feb. 11, 2022

(65) Prior Publication Data

US 2023/0255287 A1 Aug. 17, 2023

(51) Int. Cl.

*A41D 27/20* (2006.01)
*A41F 1/00* (2006.01)
*E05B 47/00* (2006.01)

(52) U.S. Cl.

CPC ............ *A41D 27/201* (2013.01); *A41F 1/002* (2013.01); *E05B 47/0002* (2013.01); *E05B 2047/0058* (2013.01); *E05B 2047/0094* (2013.01)

(58) Field of Classification Search

CPC ... A41D 27/201; A41F 1/002; E05B 47/0002; E05B 2047/0058; E05B 2047/0094
See application file for complete search history.

(56) References Cited

FOREIGN PATENT DOCUMENTS

| | | | | |
|---|---|---|---|---|
| CN | 1835690 A * | 9/2006 | ......... | H01R 13/6205 |
| JP | 6377875 B1 * | 8/2018 | | |
| WO | WO-2016100553 A1 * | 6/2016 | ............. | A41F 1/002 |

* cited by examiner

*Primary Examiner* — Mark A Williams
(74) *Attorney, Agent, or Firm* — Harrity & Harrity, LLP

(57) ABSTRACT

In some implementations, an article of clothing includes a pocket that includes an opening to an interior cavity, and a lock device attached to the pocket. The lock device may include a first lock element and a second lock element configured to engage with the first lock element, where engagement of the first lock element and the second lock element at least partially closes the opening. The lock device may include a radio communication device configured to receive a signal for engagement or disengagement of the first lock element and the second lock element, and a controller configured to cause engagement or disengagement of the first lock element and the second lock element based on the signal.

20 Claims, 5 Drawing Sheets

LOCK DEVICE

BACKGROUND

A person may carry valuable items, such as a phone, a wallet, transaction cards, cash, or the like, in a pocket or a purse in an unsecured manner. Accordingly, the items may be an easy target for pickpocketing or other theft.

SUMMARY

In some implementations, an article of clothing includes a pocket that includes an opening to an interior cavity, and a lock device attached to the pocket. The lock device includes a first lock element and a second lock element configured to engage with the first lock element, where engagement of the first lock element and the second lock element at least partially closes the opening; a radio communication device configured to receive a signal for engagement or disengagement of the first lock element and the second lock element; and a controller configured to cause engagement or disengagement of the first lock element and the second lock element based on the signal.

In some implementations, a lock system includes a container that includes an opening to an interior cavity, where one or more walls of the container that define the interior cavity are flexible; and a lock device attached to the container, the lock device including: a first lock element and a second lock element configured to engage with the first lock element, where engagement of the first lock element and the second lock element at least partially closes the opening; a radio communication device configured to receive a signal for engagement or disengagement of the first lock element and the second lock element; and a controller configured to cause engagement or disengagement of the first lock element and the second lock element based on the signal.

In some implementations, a method of locking or unlocking a lock device includes receiving, from a device and by the lock device, a signal for engagement or disengagement of a first lock element and a second lock element of the lock device, where the lock device is attached to a pocket of an article of clothing, and engagement of the first lock element and the second lock element at least partially closes an opening of the pocket; and causing, by the lock device, engagement or disengagement of the first lock element and the second lock element based on the signal.

DETAILED DESCRIPTION

The following detailed description of example implementations refers to the accompanying drawings. The same reference numbers in different drawings may identify the same or similar elements.

As described above, a person may carry valuable items in a pocket of clothing or in a personal item, such as a purse. Generally, clothing items and personal items lack sufficient security mechanisms to prevent theft of a valuable item, for example, by pickpocketing. Moreover, use of a conventional lock (e.g., a padlock) for a clothing item or a personal item is cumbersome and impedes quick access to the valuable item(s) being secured. In addition, a lock that receives locking and unlocking commands via radio communication (which may be referred to as a "smart lock") may be too bulky for clothing items or personal items and may have power demands that are prohibitive for integration into clothing items or personal items.

Some implementations described herein provide an article of clothing having a pocket with a lock device attached to the pocket. The lock device may include a first lock element and a second lock element configured to at least partially close an opening of the pocket when the lock elements are engaged. The lock device may also include a radio communication device (e.g., a radio transceiver, a radio receiver, or the like) configured to receive (e.g., from a user device, such as a smartphone) a signal for engagement or disengagement of the lock elements. Thus, based on the signal, a controller of the lock device may cause (e.g., via an actuator) engagement or disengagement of the lock elements. In this way, the lock device provides improved security for items stored in a pocket, a purse, or the like. Moreover, the lock device enables items to be accessed quickly and securely using a smartphone or a similar type of device. Furthermore, the lock device may be configured for low power operation and the lock elements may have a relatively small form factor, thereby facilitating use of the lock device in various clothing items or personal items.

Figure 1:
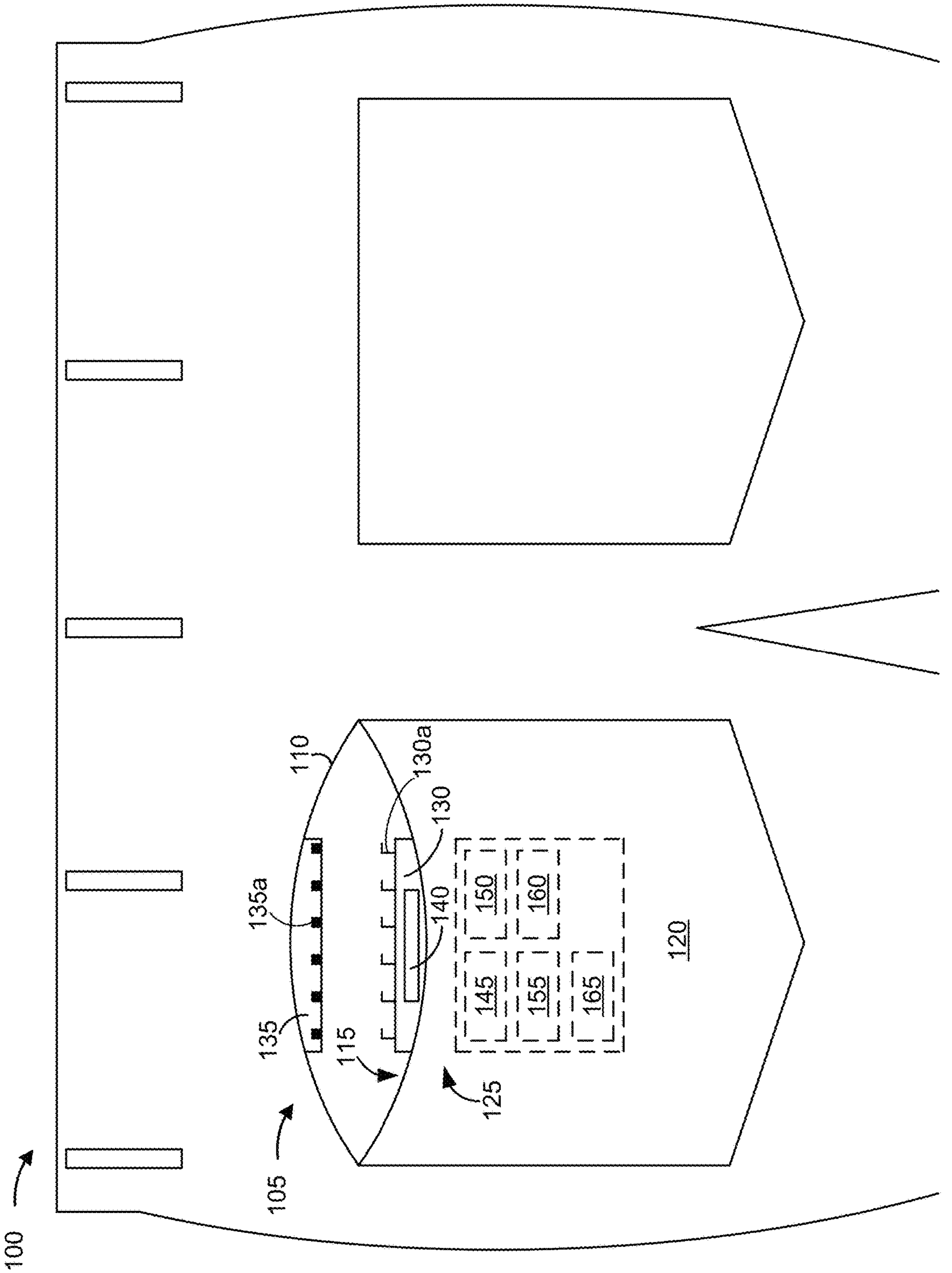
FIG. 1 is a diagram of an example article of clothing.

FIG. 1 is a diagram of an example article of clothing 100. The article of clothing 100 may be pants (e.g., lockable pants), as depicted in FIG. 1, or may be a different type of clothing, such as a shirt, shorts, a dress, a jacket, a vest, a sock, a shoe, or another wearable. The article of clothing 100 may include a pocket 105, and the pocket 105 may include an opening 110 to an interior cavity 115 of the pocket 105. The interior cavity 115 may be defined by one or more walls 120 of the pocket 105. The pocket 105 is depicted in FIG. 1 in an open configuration to illustrate the opening 110 and the interior cavity 115. In some implementations, the pocket 105 may be composed of a cut-resistant material (e.g., Kevlar).

The article of clothing 100 may include a lock device 125 attached to the pocket 105. The lock device 125 may include a first lock element 130 and a second lock element 135 configured to engage with (e.g., mate with) the first lock element 130. In some implementations, the first lock element 130 and the second lock element 135 may be respectively attached to opposing surfaces of the pocket 105. For example, the first lock element 130 and the second lock element 135 may be attached to an interior surface of one or more walls 120 of the pocket 105 (e.g., attached about the opening 110) such that the first lock element 130 faces and is aligned with the second lock element 135 (e.g., when the article of clothing 100 is in an unworn and unfolded configuration, such as when the article of clothing 100 is laid flat on a flat surface). In other words, the first lock element 130 and the second lock element 135 may be attached to the pocket in any manner that allows engagement of the first lock element 130 and the second lock element 135. Engagement of the first lock element 130 and the second lock element 135 may at least partially close the opening 110 of the pocket 105.

In some implementations, the first lock element 130 and the second lock element 135 are configured to engage magnetically. For example, the first lock element 130 may include an electromagnet and the second lock element 135 may include a ferromagnetic material (e.g., such that the first lock element 130 and the second lock element 135 engage when current is supplied to the first lock element 130). As another example, the first lock element 130 may include an electropermanent magnet and the second lock element 135 may include a ferromagnetic material (e.g., such that the first lock element 130 and the second lock element 135 disengage when current is supplied to the first lock element 130).

In some implementations, the first lock element 130 and the second lock element 135 are configured to engage mechanically. For example, the first lock element 130 may include one or more engaging members 130*a* (e.g., members that project from the first lock element 130), such as hooks, pins, bolts, or the like, and the second lock element 135 may include one or more receiving members 135*a* (e.g., members that receive the engaging members), such as slots, slits, bores, rings, or the like. The engaging member(s) 130*a* and/or the receiving member(s) 135*a* may slide to engage or disengage, extend to engage or disengage, may rotate to engage or disengage, may twist to engage or disengage, or the like. In some implementations, the engaging member(s) 130*a* may be configured to extend from or retract into a protective member (not shown), such as a tube, a sheath, or the like, of the first lock element 130. For example, the engaging member(s) 130*a* may extend from the protective member when engaging with the receiving member(s) 135*a* of the second lock element 135, and the engaging member(s) 130*a* may retract into the protective member when disengaging with the receiving member(s) 135*a*. In this way, the protective member may prevent the engaging member(s) 130*a* from snagging on skin or clothing of a wearer of the article of clothing 100 when the first lock element 130 and the second lock element 135 are disengaged.

In connection with mechanical engagement of the first lock element 130 and the second lock element 135, the lock device 125 may include an alignment mechanism (not shown). The alignment mechanism may be configured to align the first lock element 130 and the second lock element 135 (e.g., align the engaging member(s) 130*a* with the receiving member(s) 135*a*) for proper engagement of the first lock element 130 and the second lock element 135. The first lock element 130 and the second lock element 135 may include the alignment mechanism. For example, the alignment mechanism may include a set of magnetic members (e.g., two magnets or a magnet and a ferromagnetic material), and the first lock element 130 may include a first magnetic member of the set and the second lock element 135 may include a second magnetic member of the set. In this way, coupling of the magnetic members provides alignment of the first lock element 130 and the second lock element 135. In some implementations, the alignment mechanism may be attached to the pocket 105.

In some implementations, the lock device 125 may include an actuator 140 (e.g., one or more actuators 140). The actuator 140 may be configured to engage or disengage the first lock element 130 and the second lock element 135. For example, the actuator 140 may be configured to actuate (e.g., slide, rotate, extend, spin, or the like) the first lock element 130 (e.g., the engaging member(s) 130*a* of the first lock element 130) into engagement with, or to disengage from, the second lock element 135 (e.g., the receiving member(s) 135*a* of the second lock element 135). The actuator 140 may include a motor, a servomotor, and/or a linear actuator, among other examples. Moreover, the actuator 140 may be configured to operate using low power (e.g., less than 5 watts (W), less than 3 W, less than 2 W, or less than 1 W), thereby facilitating low power operation of the lock device 125.

The lock device 125 may include a radio communication device 145. The radio communication device 145 may be configured to receive (e.g., from a user device, such as a smartphone) a signal for engagement or disengagement of the first lock element 130 and the second lock element 135. The radio communication device 145 may be configured to communicate wirelessly. For example, the radio communication device 145 may be configured to communicate using radio-frequency identification (RFID), near-field communication (NFC), Bluetooth, Bluetooth Low Energy (BLE), Wi-Fi, and/or a cellular radio access technology (RAT), among other examples. The radio communication device 145 may include a radio transmitter, a radio receiver, or a radio transceiver.

The lock device 125 may include a controller 150. The controller 150 may include one or more memories, one or more processors, or the like, configured to execute a set of instructions. The controller 150 may be configured to cause engagement or disengagement of the first lock element 130 and the second lock element 135 based on the signal received at the radio communication device 145. For example, the controller 150 may be configured to cause actuation of the actuator 140 (e.g., provide an actuation signal to the actuator 140), to thereby cause engagement or disengagement of the first lock element 130 and the second lock element 135, based on the signal received at the radio communication device 145. As another example, the controller 150 may be configured to cause (e.g., by closing a switch) an electrical current to be supplied to the first lock element 130 (e.g., an electromagnet or an electropermanent magnet of the first lock element 130), to thereby cause engagement or disengagement of the first lock element 130 and the second lock element 135, based on the signal received at the radio communication device 145. The controller 150 may communicate with a switch associated with the first lock element 130, the actuator 140, and/or the radio communication device 145 via wired or wireless connections.

In some implementations, the lock device 125 may include a battery 155. The battery 155 may be configured to power one or more components of the lock device 125 (e.g., the first lock element 130, the actuator 140, the radio communication device 145, and/or the controller 150). In this way, the lock device 125 may operate without any external power transfer.

Additionally, or alternatively, the lock device 125 may include a wireless power transfer component 160. That is, the lock device 125 may be configured to receive wireless power transfer from the device (e.g., a smartphone) that transmits the signal received at the radio communication device 145. In some implementations, the lock device 125 may receive wireless power transfer from a different device. The wireless power transfer component 160 may include one or more coils for receiving wireless power transfer by electromagnetic induction. In some implementations, the lock device 125 may include a capacitor 165. The capacitor 165 may be configured to store electrical energy from wireless power transfer. In this way, the capacitor 165 may enable operations of the lock device 125 that have greater power needs (e.g., actuation of the actuator 140). The use of wireless power transfer by the lock device 125 may eliminate the need for bulky power storage devices and related circuitry, thereby facilitating miniaturization of the lock device 125.

In some implementations, a lock system may include the lock device 125. For example, the lock system may include a container that includes an opening to an interior cavity of the container, in a similar manner as described above. One or more walls of the container that define the interior cavity may be flexible (e.g., in contrast to a wood, a rigid plastic, or a metal container). For example, the one or more walls may be composed of a fabric (e.g., made from animal fur, plant fibers, or synthetic fibers) or a leather. The container may be a pocket of clothing, as described above, a bag (e.g., a purse, a backpack, a gym bag, or the like), or a wallet. The lock device 125 may be attached to the container, in a similar manner as described above. Thus, engagement of the first lock element 130 and the second lock element 135, as described above, may at least partially close the opening of the container.

As indicated above, FIG. 1 is provided as an example. Other examples may differ from what is described with regard to FIG. 1.

Figure 2:
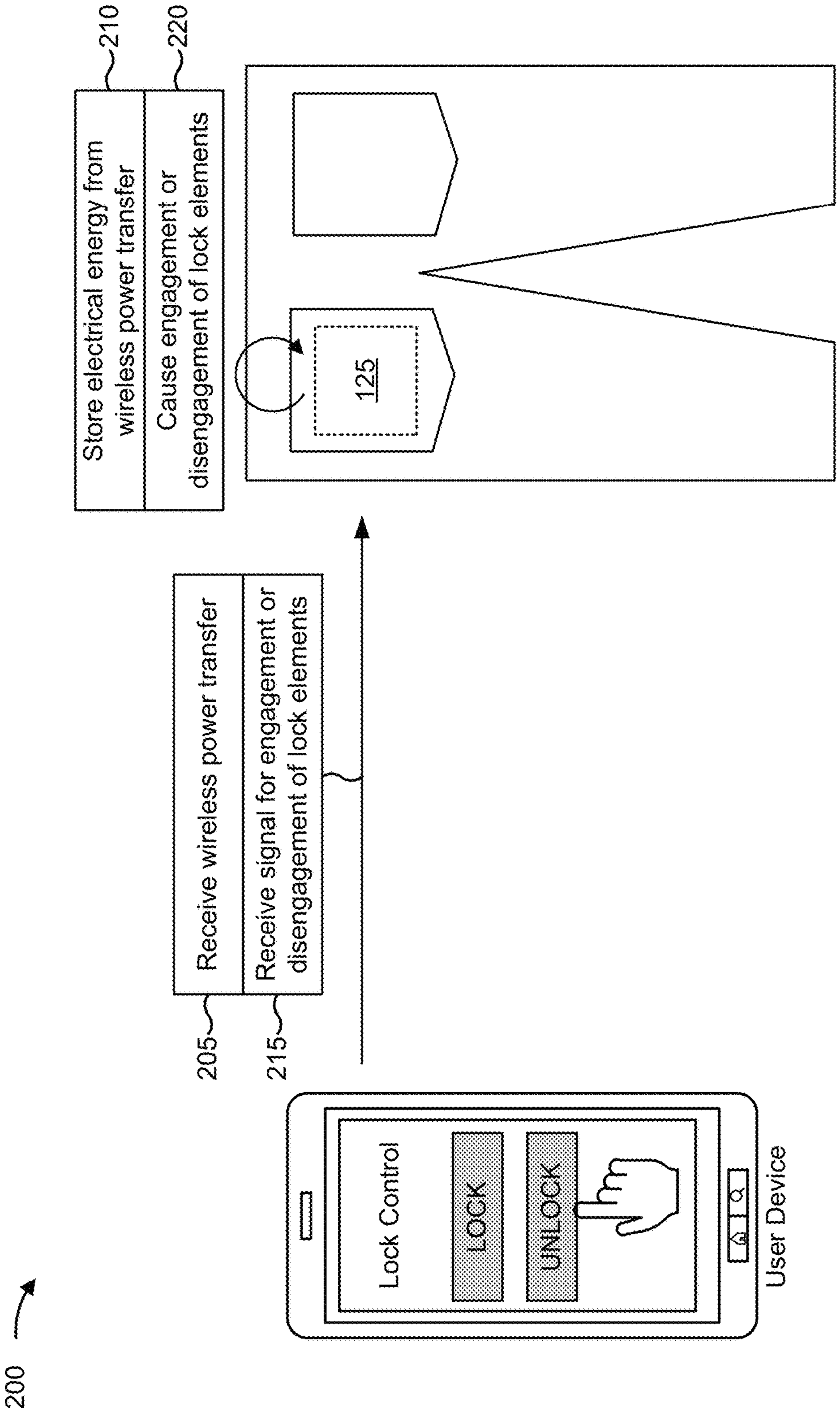
FIG. 2 is a diagram of an example associated with locking or unlocking a lock device.

FIG. 2 is a diagram of an example 200 associated with locking or unlocking a lock device. As shown in FIG. 2, example 200 includes the lock device 125, described in connection with FIG. 1, and a user device. These devices are also described in more detail in connection with FIGS. 3 and 4. The user device may be associated with a user, and the user may be wearing an article of clothing (e.g., clothing 100) that includes the lock device 125 or using a personal item (e.g., a purse, a backpack, a wallet, or the like) that includes the lock device 125.

In some implementations, the user device may be authenticated for locking or unlocking the lock device 125. For example, in an initial setup, the user device may obtain a code stored by the lock device 125. The user device may obtain the code from the lock device 125 (e.g., via wireless communication with the lock device 125), or the user device may obtain the code from a user input to the user device. As another example, in the initial setup, the user device may provide a code associated with the user device to the lock device 125 (e.g., via wireless communication) for storage on the lock device 125. In either case, the code may be an authentication factor for accessing locking or unlocking operations of the lock device 125 (e.g., the user device, which stores the code, may be used as an authentication factor for accessing locking or unlocking operations of the lock device 125).

In connection with locking or unlocking of the lock device 125, the user device may be in close proximity (e.g., within 1 foot, within 6 inches, within 1 inch, or the like) of the lock device 125. For example, the user may move the user device into close proximity of the lock device 125 (e.g., tap the user device on the lock device 125) in order to lock or unlock the lock device 125. In particular, if the lock device 125 is locked, the user device may be brought into close proximity of the lock device 125 in order to unlock the lock device 125. In some implementations, the user device may implement an application for controlling the lock device 125. For example, in connection with the application, the user device may present a user interface that includes one or more controls for locking or unlocking the lock device 125. Here, the controls of the user interface may be used in conjunction with bringing the user device into close proximity of the lock device 125 in order to lock or unlock the lock device 125. Moreover, the user interface may enable the user to input particular settings for the lock device 125 to the user device. For example, a setting may be a timer setting for automatically locking or unlocking the lock device 125 (e.g., locking or unlocking of the lock device 125 may be powered, when the user device is no longer in proximity of the lock device 125, using the battery 155 or the capacitor 165).

As shown by reference number 205, the lock device 125 may receive a wireless power transfer from the user device (or a different device). For example, the user device may transmit a signal that induces a current in the lock device 125 (e.g., in the wireless power transfer component 160). In some implementations, as described above, the lock device 125 may include the battery 155, and the lock device 125 does not need the wireless power transfer from the user device in order to operate. In some implementations, the wireless power transfer from the user device may be used to recharge the battery 155. As shown by reference number 210, the lock device 125 may store, in the capacitor 165, electrical energy from the wireless power transfer from the user device. For example, holding the user device in close proximity of the lock device 125 for at least a threshold time period (e.g., 1 second, 2 seconds, or 3 seconds) may enable sufficient electrical energy for powering the lock device 125 to be stored in the capacitor 165.

As shown by reference number 215, the lock device 125 may receive (e.g., using the radio communication device 145), from the user device, a signal for engagement or disengagement of the first lock element 130 and the second lock element 135. The signal for engagement or disengagement may be the same signal used for the wireless power transfer or may be a separate signal. The signal for engagement or disengagement may indicate the code communicated between the lock device 125 and the user device during the initial setup. The lock device 125 may receive the signal wirelessly from the user device (e.g., using RFID, NFC, Bluetooth, BLE, Wi-Fi, a cellular RAT, or the like).

As shown by reference number 220, the lock device 125 may cause engagement or disengagement of the first lock element 130 and the second lock element 135 based on the signal. In some implementations, the lock device 125 (e.g., using the controller 150) may determine whether a code indicated by the signal corresponds to the original code communicated between the lock device 125 and the user device during the initial setup. The lock device 125 may cause engagement or disengagement of the first lock element 130 and the second lock element 135 based on a determination that the code indicated by the signal corresponds to the original code. The lock device may cause engagement or disengagement of the first lock element 130 and the second lock element 135 using electrical energy from the wireless power transfer (e.g., electrical energy induced from the wireless power transfer) and/or using the electrical energy stored in the capacitor 165.

In one example, the lock device 125 may actuate (e.g., using actuator 140) the first lock element 130 (e.g., actuate the engaging member(s) 130*a* of the first lock element 130) to cause engagement or disengagement of the first lock element 130 and the second lock element 135. In another example, the lock device 125 may supply current (e.g., by causing a switch to close) to the first lock element 130 (e.g., to an electromagnet or an electropermanent magnet of the first lock element 130) to cause engagement or disengagement of the first lock element 130 and the second lock element 135.

As indicated above, FIG. 2 is provided as an example. Other examples may differ from what is described with regard to FIG. 2.

Figure 3:
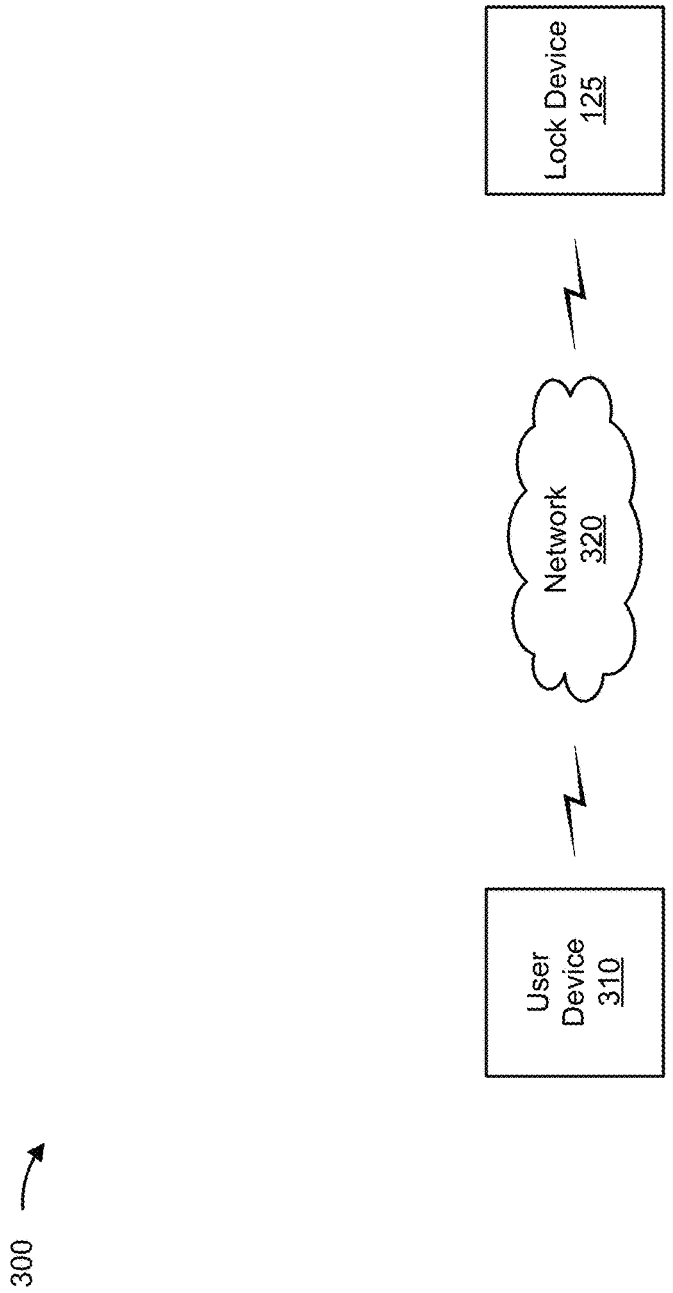
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include the lock device 125, a user device 310, and a network 320. Devices of environment 300 may interconnect via wired connections, wireless connections, or a combination of wired and wireless connections.

The lock device 125 includes one or more devices capable of receiving, generating, storing, processing, and/or providing information associated with locking or unlocking the lock device 125, as described elsewhere herein. The lock device 125 may include a communication device and/or a computing device, as described elsewhere herein.

The user device 310 includes one or more devices capable of receiving, generating, storing, processing, and/or providing information associated with locking or unlocking the lock device 125, as described elsewhere herein. The user device 310 may include a communication device and/or a computing device. For example, the user device 310 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 320 includes one or more wired and/or wireless networks. For example, the network 320 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
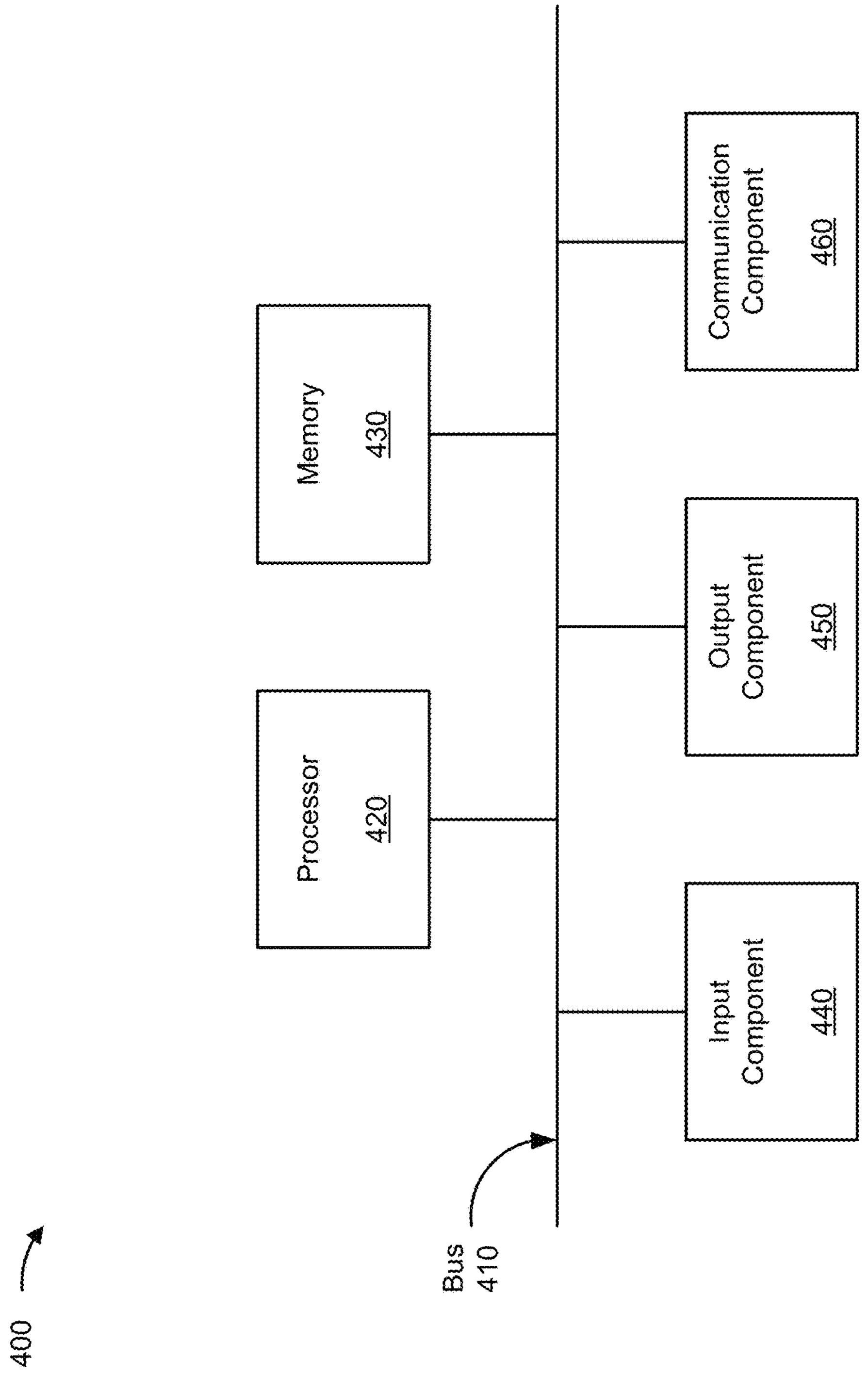
FIG. 4 is a diagram of example components of one or more devices of FIG. 3.

FIG. 4 is a diagram of example components of a device 400, which may correspond to lock device 125 and/or user device 310. In some implementations, lock device 125 and/or user device 310 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 (e.g., which may correspond to controller 150, described above) includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 (e.g., which may correspond to radio communication device 145, described above) enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
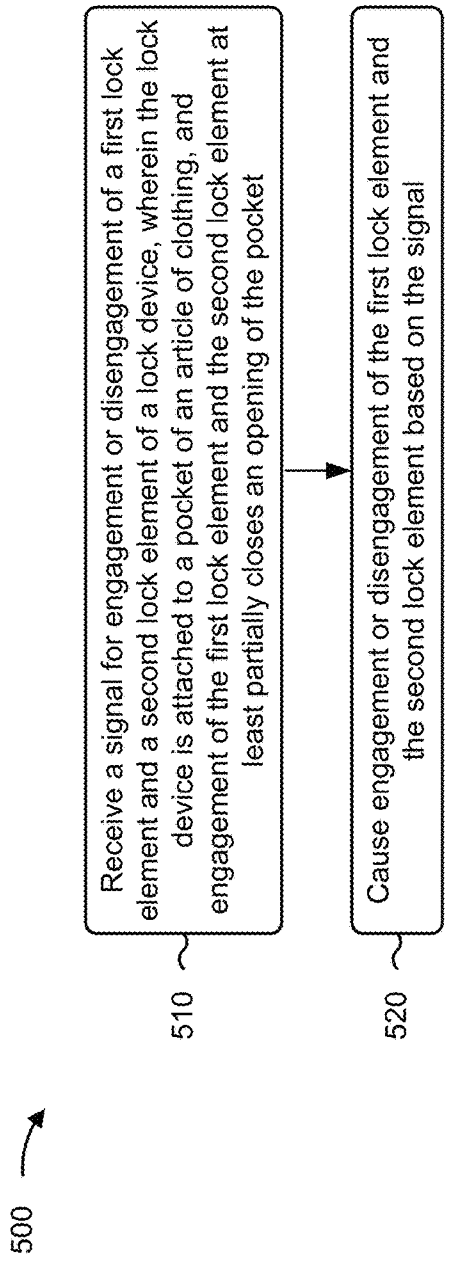
FIG. 5 is a flowchart of an example process relating to locking or unlocking a lock device.

FIG. 5 is a flowchart of an example process 500 associated with locking or unlocking a lock device. In some implementations, one or more process blocks of FIG. 5 may be performed by a lock device (e.g., lock device 125). In some implementations, one or more process blocks of FIG. 5 may be performed by another device or a group of devices separate from or including the lock device, such as a user device (e.g., user device 310). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving a signal for engagement or disengagement of a first lock element and a second lock element of a lock device, wherein the lock device is attached to a pocket of an article of clothing, and engagement of the first lock element and the second lock element at least partially closes an opening of the pocket (block 510). As further shown in FIG. 5, process 500 may include causing engagement or disengagement of the first lock element and the second lock element based on the signal (block 520).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1-2.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An article of clothing, comprising:

a pocket that includes an opening to an interior cavity;

a lock device attached to the pocket, the lock device comprising:

a first lock element and a second lock element, the first lock element and the second lock element configured to engage or disengage with each other based on a wireless signal for engagement or disengagement of the first lock element and the second lock element, wherein engagement of the first lock element and the second lock element at least partially closes the opening;

an actuator device or an alignment mechanism that causes engagement or disengagement of the first lock element and the second lock element based on the wireless signal;

a radio communication device configured to receive the wireless signal; and a controller configured to cause engagement or disengagement of the first lock element and the second lock element based on the signal.

2. The article of clothing of claim 1, wherein the lock device further comprises a battery.

3. The article of clothing of claim 1, wherein the lock device is configured to receive wireless power transfer.

4. The article of clothing of claim 1, wherein the lock device further comprises a capacitor configured to store electrical energy from wireless power transfer.

5. The article of clothing of claim 1, wherein the controller, to cause engagement or disengagement of the first lock element and the second lock element, is configured to:

cause actuation of the first lock element for engagement or disengagement with the second lock element.

6. The article of clothing of claim 1, wherein the first lock element includes one or more engaging members and the second lock element includes one or more receiving members configured to receive the one or more engaging members.

7. The article of clothing of claim 1, wherein the first lock element includes an electromagnet or an electropermanent magnet and the second lock element includes a ferromagnetic material.

8. The article of clothing of claim 1, wherein the radio communication device is configured to communicate using near-field communication.

9. A lock system, comprising:

a container that includes an opening to an interior cavity, wherein one or more walls of the container that define the interior cavity are flexible; and a lock device attached to the container, the lock device comprising:

a first lock element and a second lock element, the first lock element and the second lock element configured to engage or disengage with each other based on a wireless signal for engagement or disengagement of the first lock element and the second lock element, wherein engagement of the first lock element and the second lock element at least partially closes the opening;

an actuator device or an alignment mechanism that causes engagement or disengagement of the first lock element and the second lock element based on the wireless signal;

a radio communication device configured to receive the signal; and a controller configured to cause engagement or disengagement of the first lock element and the second lock element based on the signal.

10. The lock system of claim 9, wherein the container is a pocket of clothing, a bag, or a wallet.

11. The lock system of claim 9, wherein the one or more walls comprise a fabric or a leather.

12. The lock system of claim 9, where the lock device further comprises an actuator configured to engage or disengage the first lock element and the second lock element.

13. The lock system of claim 9, wherein the lock device is configured to receive wireless power transfer.

14. The lock system of claim 9, wherein the lock device further comprises a capacitor configured to store electrical energy from wireless power transfer.

15. The lock system of claim 9, wherein the first lock element and the second lock element are configured to engage mechanically or configured to engage magnetically.

16. A method, comprising:

receiving, by a device, a wireless signal for engagement or disengagement of a first lock element and a second lock element, wherein the device comprises:

the first lock element and the second lock element configured to engage or disengage with each other based on a wireless signal for engagement or disengagement of the first lock element and the second lock element, wherein engagement of the first lock element and the second lock element at least partially closes an opening;

an actuator device or an alignment mechanism that causes engagement or disengagement of the first lock element and the second lock element based on the wireless signal;

a radio communication device configured to receive the wireless signal; and a controller configured to cause engagement or disengagement of the first lock element and the second lock element based on the wireless signal.

17. The method of claim 16, wherein the device is configured to receive wireless power transfer.

18. The method of claim 16, wherein the lock device further comprises a capacitor configured to store electrical energy from wireless power transfer.

19. The method of claim 16, wherein the controller is configured to:

cause actuation of the first lock element for engagement or disengagement with the second lock element.

20. The method of claim 16, wherein the radio communication device is configured to communicate using near-field communication.

* * * * *